3,838,106
MANUFACTURE OF UNSATURATED
POLYESTERS
Albert R. Shuki, Summit, and Dennis E. Smola, Cuyahoga, Ohio, assignors to The Standard Oil Company, Cleveland, Ohio
No Drawing. Filed July 20, 1972, Ser. No. 273,473
Int. Cl. C08g 17/007
U.S. Cl. 260—75 M                13 Claims

ABSTRACT OF THE DISCLOSURE

This invention relates to a non-catalytic process for the manufacture of curable unsaturated polyesters comprising reacting (1) maleic anhydride with a polyhydric alcohol which may be a dihydric alcohol or a combination of a dihydric alcohol and a polyhydric alcohol containing three or more hydroxyl groups, and (2) further reacting the intermediate ester so-formed with an aromatic anhydride and an oxirane compound.

---

This invention relates to a process for the production of unsaturated polyesters and more particularly pertains to a process for the manufacture of active unsaturated polymeric polyesters from organic acid anhydrides and oxirane compounds.

Processes for the manufacture of polyester resins by the reaction of organic anhydrides with oxirane compounds in the presence of one or more catalytic materials have previously been described in U.S. Pats. Nos. 3,355,434 and 3,370,043.

It has now been surprisingly discovered that readily curable unsaturated polyester resins can be attained rapidly in a non-catalytic process which involves (1) heating a mixture of maleic anhydride and a polyhydric alcohol at a temperature in the range of about 115° to 190° C. to form an intermediate ester primarily of the fumarate-type of high acid number, and (2) further reacting (1) with an aromatic anhydride and an oxirane compound in the temperature range of about 80° to 135° C. The unsaturated polyester product which optionally can be mixed with a cross-linking monomer such as styrene, is readily cross-linked by the usual techniques well known in the field of unsaturated polyester technology.

In the first step, the maleate ester in the polymer chain made with maleic anhydride is isomerized to the fumarate configuration. The latter reacts far more readily with cross-linking monomers such as styrene than the maleate configuration, resulting in faster cure times and higher heat distortion temperatures.

The instant process offers several advantages over prior art processes for the preparation of active unsaturated polyester resins. For example, the activation step takes place more rapidly at high acid number of the intermediate ester, thereby reducing kettle time for a resin batch. Further, an acceptable resin viscosity can be achieved directly after the oxirane compound is reacted, again resulting in reduced kettle time. The savings in kettle time and the fact that no catalyst is required in the production of the unsaturated polyesters by the instant process result in a lower processing cost and a less expensive resin. The absence of a catalyst in the instant process also results in the production of resins with less color as compared with those prepared by processes in which a catalyst is required. In addition, the resin of the present invention is more versatile in the absence of a catalyst or catalyst residues, since it can be promoted with polymerization promoting additives, such as cobalt octoate, for applications requiring a low temperature cure. Various esterification and isomerization reaction catalysts quite often interfere with the promoted cure of a polyester resin.

The first step of this process comprises reacting maleic anhydride with a polyhydric alcohol at a temperature in the range of about 115° to 190° C. to effect esterification and isomerization. At temperatures below this range, conversions to the ester are low, while above this range increased color formation is observed. The reaction time will usually be from about 0.5 to about 4 hours, depending upon the extent to which the reaction is to proceed as will be discussed in greater detail below.

The polyhydric alcohol utilized in the first step of this process may comprise a dihydric alcohol alone or a portion of the dihydric alcohol may be replaced with a polyhydric alcohol which contains three or more hydroxyl groups per molecule. Because dihydric alcohols function to some extent as chain terminators, the use of a dihydric alcohol by itself usually requires a condensation step following the reaction with the oxirane compound and aromatic anhydride to increase the molecular weight and viscosity of the resin to within the desired range. This condensation step, however, is not essential in instances where the dihydric alcohol has been partially replaced with a polyhydric alcohol containing three or more hydroxyl groups, since the viscosity of the resin increases more rapidly in the presence of a greater number of hydroxyl reaction sites. Generally shorter reaction times are required and less color develops with the use of some of the polyhydric alcohol because of the milder reaction conditions required.

The dihydric alcohol to be used in the first step of this invention is preferably a 1,2-glycol but may also be a higher aliphatic dihydric alcohol. Such materials include: ethylene glycol, the propylene glycols, the butylene glycols, specific members being 1,2-propylene glycol, 1,3-propylene glycol, 1,2-butanediol, 1,4-butanediol, 2-butene-1,4-diol, diethylene glycol, dipropylene glycol, and polyethylene and polypropylene glycols such as, for example, those having molecular weights of about 400, and the like.

Polyhydric alcohols containing three or more hydroxyl groups per molecule useful in the present invention include: glycerol, pentaerythritol, dipentaerythritol, tripentaerythritol, trimethylolpropane, 1,2,6-hexanetriol, sorbitol, mannitol, and the like. Most preferred are glycerol and pentaerythritol.

Activation of the unsaturation does not readily occur unless the maleic anhydride ring has been opened and isomerized by reaction with a hydroxyl group. Because one mole of dihydric alcohol may react with two moles of maleic anhydride, one mole of a trihydric alcohol may react with three moles of maleic anhydride, etc., a reacting ratio of glycol (either dihyric or polyhydric) per hydroxyl group to maleic anhydride is about 1:1.

Generally a 50 to 90 weight percent conversion of maleic anhydride is obtained at 1:1 mole ratio of hydroxyl groups to maleic anhydride. To maximize conversion, however, an excess of hydroxyl groups is preferred, and molar ratios of hydroxyl groups to maleic anhydride of between 1.0 and 1.5 have been found to be beneficial.

The molar ratio of the dihydric to the polyhydric alcohol affects the conversion of maleic anhydride, as indicated earlier. It also controls the final viscosity of the polyester resin. A large range of final resin viscosity can be achieved by substituting some polyhydric alcohol for dihydric alcohol and by varying the molar ratio of dihydric to polyhydric alcohol of from about 1:1 to 6:1, depending upon the functionality of the polyhydric alcohol. A preferred range of diol to polyol of from 2:1 to 4:1 provides a moderate maleic anhydride conversion and a Gardner viscosity in the range of G to I.

In the second step of this process, the intermediate ester products from the first step is further reacted with an aromatic carboxylic anhydride, such as a phthalic anhydride, and an oxirane compound, such as propylene oxide. This step is preferably carried out at a temperature in the range of from about 80° to about 135° C. The lower temperature limit is governed by the crystallization of phthalic anhydride, and the upper limit is governed somewhat by the development of color and also by the reduced solubility of the oxirane compound in the reactants. The pressure employed may affect oxide solubility, but the pressure can be autogenous, if desired. Reaction times in this step may vary from about 3 to about 8 hours. The total reaction time for the combined steps of this process will usually be in the range of about 5 to 10 hours to provide a polyester having the desired acid number.

The second step of this process is preferredly carried out under anhydrous or substantially anhydrous conditions, since any water present can act as a chain terminator, thereby lowering the molecular weight. If the amount of water present is known, allowance can be made for it so that the molecular weight will not be affected.

The aromatic acid anhydride used in the second step of the process of this invention preferredly is phthalic anhydride. Other anhydrides that may be used are aromatic or aliphatic dibasic acid anhydrides which may be saturated or unsaturated. Examples include, succinic anhydride, itaconic anhydride, chlorendic anhydride, tetrahydrophthalic anhydride, tetrachlorophthalic anhydride, glutaric anhydride, and the corresponding homologues and analogues thereof.

The oxirane compound to be utilized in accordance with the present invention is a monoepoxide which contains the epoxide grouping in a terminal position and conforms to the structure:

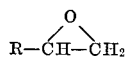

wherein R is hydrogen, a $C_1$–$C_{18}$ alkyl group, an aryl group, a $C_1$–$C_4$ haloalkyl group, mixtures thereof. For instance, ethylene oxide, propylene oxide, 1,2-butylene oxide, styrene oxide, epichlorohydrin, dodecene oxide etc., may be used alone or in admixture.

The molar ratio of the aromatic to the maleic anhydride can be varied over a wide range, as for example from about 1:1 to 3:1, to achieve varying amounts of resiliency or rigidity of the polymer. The effect of varying the anhydride ratios as well as the selection of the anhydride is well known in the art of unsaturated polyester technology. The molar ratio of the combined dihydride alcohol, polyhydric alcohol and oxirane compound with the dibasic acid anhydrides should be at least about 1:1 and preferredly should be slightly greater than this, as for instance, not more than about 1.6:1.

A third step may be used to increase the final viscosity of the resin to the desired level. The equilibrium rate of condensation and rate of water removal are the controlling factors in determining batch time. The rate of water removal is affected by temperature, concentration of water in the polyester, and rate of purge with an inert gas. The upper temperature limit in this step is controlled by the development of color, so that temperatures in excess of 240° C. are generally to be avoided, while at temperatures below about 150° C. the rate of water removal is below practical limits. The use of vacuum also increases the condensation rate of the polyester, however, a vacuum level above about 5 inches of mercury may draw trace oxygen into the system and discolor the resin.

Generally it is preferred that the condensation step be carried out at temperature ranging from about 175° to 230° C., for a period of about 1 to 7 hours under an inert gas purge, preferably a nitrogen purge, at a rate of about 0.1 to 1.0 c.f.h. per pound of resin. If desired, the final polyester may then be thinned with a cross-linking monomer such as, for example, styrene, to form the basic starting material for molding and casting.

The present invention will be further illustrated by the following examples wherein the amounts of ingredients are expressed as parts by weight unless otherwise specified. All heat distortion temperatures were determined by ASTM D648–56 at 264 p.s.i. on cross-linked resins. The resin solids were diluted with 35 percent styrene containing 30 p.p.m. of 6 percent copper naphthenate and 18.5 p.p.m. hydroquinone and catalyzed with 1 percent by weight benzoyl peroxide. The resulting resin was cast and cured at 110° C. between two glass plates (⅛ inch thickness), then cut into ½ inch wide bars for HDT testing. The yellowness level of the thinned resin was measured visually against prepared platinum-cobalt standards using ASTM D1209–69. This is described in the subsequent examples as an APHA color.

EXAMPLE 1

*Step 1.*—Into a 75 gallon reactor (55 gallon capacity) were added with stirring 45.6 lbs. (0.6 moles) of propylene glycol and 98 lbs. (1 mole) of maleic anhydride under a nitrogen atmosphere. Durnig the exothermic reaction which followed the temperature rose from 60° to 163° C. in 30 minutes, and the mixture was then held at 163° C. for 2 hours. The reactor pressure ranged from 10 to 20 p.s.i.g. throughout the reaction. Upon completion the ester product was found by nuclear magnetic resonance to contain about 80 percent fumarate (trans) configuration.

*Step 2.*—To the reaction product obtained in step 1 was added 236.8 lbs. (1.6 moles) of phthalic anhydride and the mixture was heated to 115° C. with stirring while under a nitrogen atmosphere. 165 lbs. (2.85 moles) of propylene oxide was then added to this mixture at 115° C. over a period of four hours. The polyester product had an acid number of 90 and a Gardner Viscosity of A.

*Step 3.*—The product from step 2 was purged with nitrogen at a rate of 2.4 c.f.m. (standard temperature and pressure) and at a temperature of 205° C. for a total of 5½ hours to remove water and to increase the viscosity of the product. After stripping, the product had a Gardner viscosity of G to H, an acid number of 40, and an APHA color of 40. The heat distortion temperature of the cross-linked polyester was 61° to 64° C. at 264 p.s.i.

EXAMPLE 2

*Step 1.*—A mixture of 0.38 mole of propylene glycol, 0.1 mole of glycerol and 1.0 mole of maleic anhydride was stirred and brought to a temperature of about 115° C. under a nitrogen atmosphere. An exotherm took place which caused the reactor temperature to rise to about 165° C. The reaction was held at 168° C. for two hours after the exotherm. The ester product was found by Nuclear Magnetic Resonance analysis to contain on the order of from about 70 to 75 percent of the fumarate (trans) configuration.

*Step 2.*—To the reaction mixture in step 1 was added 1.6 moles of phthalic anhydride and the mixture was heated to 121° C. under a nitrogen atmosphere with stirring. Propylene oxide (1.4 moles) was then added to the reactor through a cold water condenser over a period of four hours. The resulting unsaturated polyester was found to have an acid number of 40, a Gardner viscosity of H to J (60 percent solids in methyl Cellosolve), and an APHA color of 50 to 100. The HDT of the cross-linked polyester was 50° to 55° C.

EXAMPLE 3

The procedure in Example 2 was repeated with the exception that pentaerythritol was substituted for glycerol. The reactants were combined in the following amounts:

| Step 1: | Moles |
|---|---|
| Maleic anhydride | 1.0 |
| Propylene glycol | 0.28 |
| Pentaerythritol | 0.11 |
| Step 2: | |
| Phthalic anhydride | 1.6 |
| Propylene oxide | 2.7 |

The reaction time in the first step was two hours and in the second step six hours.

The polyester obtained had an acid number of 101, a Gardner viscosity of H, an APHA color of less than 50, and an HDT at 264 p.s.i. of 52° C.

EXAMPLE 4

The procedure of Example 3 was repeated and the reactants were combined in the following amounts:

| Step 1: | Moles |
|---|---|
| Maleic anhydride | 1.1 |
| Propylene glycol | 0.3 |
| Pentaerythritol | 0.12 |
| Step 2: | |
| Phthalic anhydride | 1.6 |
| Propylene oxide | 3.1 |

The resulting unsaturated polyester had an acid number of 61, a Gardner viscosity of G, an APHA color of 50 and an HDT of 52° C.

We claim:

1. A process for the production of unsaturated polyesters comprising reacting in the absence of a catalyst:
   (A) a mixture of maleic anhydride and a polyhydric alcohol at a temperature in the range of from about 115° to 190° C. for from about 0.5 to 4 hours, and
   (B) reacting the product obtained from (A) with an aromatic acid anhydride and an oxirane compound at a temperature in the range of from about 80° to 135° C. for from about 3 to 8 hours.

2. The process in claim 1 wherein the polyhydric is a dihydric alcohol.

3. The process in claim 2 wherein the dihydric alcohol is at least one member selected from the group consisting of ethylene glycol, 1,2-propylene glycol, 1,3-propylene glycol, 1,2-butanediol, 1,4-butanediol, 2-butene-1,4-diol, diethylene glycol, dipropylene glycol, polyethylene glycol and polypropylene glycol.

4. The process in claim 1 wherein the polyhydric alcohol is a combination of a dihydric alcohol and a polyhydric alcohol containing three or more hydroxyl groups per molecule.

5. The process in claim 4 wherein the molar ratio of the combined polyhydric alcohols and the oxirane compound with the combined maleic and aromatic acid anhydrides in steps (A) and (B) is from about 1:1 to about 1.6:1.

6. The process in claim 5 wherein in step (A) the polyhydric alcohols are reacted with the maleic anhydride in a molar ratio of 1 to 1.5 moles of active hydroxyl groups per mole of maleic anhydride.

7. The process in claim 6 wherein the molar ratio of the aromatic acid anhydride in step (B) to the maleic anhydride in step (A) is within the range of about 1:1 to 3:1.

8. The process in claim 7 wherein the molar ratio of the dihydric alcohol to the polyhydric alcohol containing three or more hydroxyl groups is from 1:1 to 6:1.

9. The process in claim 4 wherein the polyhydric alcohol containing three or more hydroxyl groups per molecule is at least one member selected from the group consisting of glycerol, pentaerythritol, dipentaerythritol, tripentaerythritol, trimethylolpropane, 1,2,6 - hexanetriol, sorbitol and mannitol.

10. The process in claim 1 wherein the oxirane compound is a member selected from the group conforming to the structure:

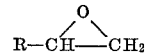

wherein R is hydrogen, a $C_1$-$C_{18}$ alkyl group, an aryl group, and a $C_1$-$C_4$ haloalkyl group.

11. The process in claim 10 wherein the aromatic acid anhydride in step (B) is a member selected from the group consisting of phthalic anhydride, tetrahydrophthalic anhydride, and tetrachlorophthalic anhydride.

12. The process in claim 11 wherein in step (A) the polyhydric alcohol is propylene glycol, and in step (B) the aromatic acid anhydride is phthalic anhydride and the oxirane compound is propylene oxide.

13. The process in claim 12 wherein in step (A) the polyhydric alcohol is a combination of propylene glycol and glycerol.

References Cited
UNITED STATES PATENTS

| 2,822,350 | 2/1958 | Hayes | 260—78.4 |
| 3,089,863 | 5/1963 | Hicks et al. | 260—75 |
| 3,213,067 | 10/1965 | Pohl et al. | 260—78.4 |
| 3,254,060 | 5/1966 | Connolly et al. | 260—78.4 |
| 3,355,434 | 11/1967 | Milligan et al. | 260—75 |
| 3,370,043 | 2/1968 | Milligan | 260—75 |
| 3,374,208 | 3/1968 | Seiner et al. | 260—78.4 |
| 3,723,390 | 3/1973 | Carpenter et al. | 260—75 M |

OTHER REFERENCES

Bjorksten, Polyesters, Reinhold, New York, 1956, pp. 35–45.

MELVIN GOLDSTEIN, Primary Examiner

U.S. Cl. X.R.

260—75 EP, 75 UA

UNITED STATES PATENT OFFICE
CERTIFICATE OF CORRECTION

Patent No. 3,838,106      Dated September 24, 1974

Inventor(s) Albert R. Shuki et al.

It is certified that error appears in the above-identified patent and that said Letters Patent are hereby corrected as shown below:

Column 1, line 29, "organic anhydrides" should read -- organic acid anhydrides --.

Column 2, lines 63 and 64, "for dihydric" should read -- for the dihydric --.

Column 2, line 71, "products" should read -- product --.

Column 3, line 48, "dihydride" should read -- dihydric --.

Column 4, line 19, "Durnig" should read -- During --.

Column 4, line 57, "1.4 moles" should read -- 2.4 moles --.

Signed and Sealed this

Fourteenth Day of December 1976

[SEAL]

Attest:

RUTH C. MASON
Attesting Officer

C. MARSHALL DANN
Commissioner of Patents and Trademarks